US012667860B2

(12) United States Patent
Price et al.

(10) Patent No.: US 12,667,860 B2
(45) Date of Patent: Jun. 30, 2026

(54) MULTI-OUTLET SPRAY NOZZLE ASSEMBLY WITH DUAL CHECK VALVES

(71) Applicant: Spraying Systems Co., Wheaton, IL (US)

(72) Inventors: Trevor Price, Elgin, IL (US); Timothy Winter, Vernon Hills, IL (US); Marc Arenson, South Elgin, IL (US)

(73) Assignee: Spraying Systems Co., Wheaton, IL (US)

(*) Notice: Subject to any disclaimer, the term of this patent is extended or adjusted under 35 U.S.C. 154(b) by 35 days.

(21) Appl. No.: 18/645,514

(22) Filed: Apr. 25, 2024

(65) Prior Publication Data

US 2024/0359198 A1 Oct. 31, 2024

Related U.S. Application Data

(60) Provisional application No. 63/461,960, filed on Apr. 26, 2023.

(51) Int. Cl.
*B05B 1/14* (2006.01)
*A01M 7/00* (2006.01)
*B05B 12/08* (2006.01)

(52) U.S. Cl.
CPC .............. *B05B 12/087* (2013.01); *B05B 1/14* (2013.01)

(58) Field of Classification Search
CPC ........... B05B 1/14; B05B 1/1645; B05B 1/20; B05B 1/3006; B05B 1/16; B05B 1/1636; B05B 12/087; B05B 15/658
See application file for complete search history.

(56) References Cited

U.S. PATENT DOCUMENTS 7,066,402 B2 * 6/2006 Goebel ................. A01M 7/006 239/444
11,470,834 B2 * 10/2022 Price ................... A01M 7/0089
(Continued)

FOREIGN PATENT DOCUMENTS

EP 0631949 A2 11/2015

OTHER PUBLICATIONS

International Search Report mailed Jun. 27, 2024, in International Patent Application No. PCT/US2024/026142, filed Apr. 25, 2024.

*Primary Examiner* — Devon C Kramer
*Assistant Examiner* — Sean V Meiller
(74) *Attorney, Agent, or Firm* — Leydig, Voit & Mayer Ltd.

(57) ABSTRACT

A liquid spraying system having an elongated spray boom with a plurality of spray nozzle assemblies supported thereon. Each spray nozzle assembly has a compact design with first spray nozzle supported on an underside of the spray boom and a turret spray nozzle on a lateral side. Fluid control check valves for the spray nozzles are supported on respective check valve support sections having have annular liquid supply passages offset from each with lateral sides in overlapping relation defining a common liquid inlet to the check valves for directly receiving liquid from a nozzle body inlet passage for more efficient operation. The check valve support sections are in laterally adjacent, longitudinally offset relation to each for defining clearance spaces opening under the spray boom for accommodating potentially interfering items suspended from the spray boom.

8 Claims, 11 Drawing Sheets

(56) References Cited

U.S. PATENT DOCUMENTS

| | | | | |
|---|---|---|---|---|
| 2002/0190140 | A1 | 12/2002 | Arenson et al. | |
| 2008/0087750 | A1 | 4/2008 | Waddelow et al. | |
| 2015/0289443 | A1* | 10/2015 | Garuti | B05B 12/088 239/444 |

* cited by examiner

MULTI-OUTLET SPRAY NOZZLE ASSEMBLY WITH DUAL CHECK VALVES

CROSS-REFERENCE TO RELATED APPLICATION

This patent application claims the benefit of U.S. Provisional Patent Application No. 63/461,960, filed Apr. 26, 2023, which is incorporated by reference.

BACKGROUND OF THE INVENTION

Agricultural spray booms typically carry a large number of laterally spaced spray nozzle assemblies along the length of the boom. Each spray nozzle assembly commonly comprises a plurality of spray nozzles including turret mounted spray nozzles which include a rotatable turret carrying a multiplicity of different spray tips for selected indexing to an operative position. Such spray nozzle assemblies further commonly include one or more check valves for instantaneously interrupting the discharge of liquid from the spray nozzles upon shut off of the spray for preventing waste and over application of the liquid chemical, which further adds to the bulk and size of each assembly. The multiciplity of such check valves further can interfere with other items mounted on the boom.

Such agricultural spray booms can be relatively long in length, such as 80 feet or more, to maximize spraying during each path of travel. To facilitate transport and storage of the spray boom when not in use, the spray booms have pivot joints that enable opposite sides or segments of the boom to be folded into side by side relation to each other. Due to the bulk and size of the spray nozzle assemblies and their protuberance forward and rearward from the boom, upon positioning of the spray boom sections into overlying side-by-side relation, the spray nozzle assemblies can come into engaging and damaging contact with each other, necessitating repair or replacement and downtime of the sprayer.

Spray nozzle assemblies for spray booms that have both a compact design and multiple check valves are known. However, such spray nozzle assemblies can have severely obstructed flow passages associated with one or more of the check valves. These obstructed flow passages can adversely affect the flow efficiency of the spray nozzle assembly and thus make spraying operations less efficient and more costly.

OBJECTS OF THE INVENTION

In view of the foregoing, a general object of the present invention is to provide a spray nozzle assembly of the foregoing type that has a multi-check valve compact design for interrupting the flow of liquid to a multiplicity of spray nozzles without undesirable protuberances from the spray nozzle assembly.

Another object of the present invention is provide a multi check-valve spray nozzle assembly of the foregoing type that has improved flow efficiency to the multiple spray outlets and, as a result, more efficient spray operation with a compact design.

A further object of the present invention is to provide a spray nozzle assembly with multiple check valves and spray outlets and a compact design that prevents interfering contact between spray nozzle assemblies on a boom when the boom is folded.

Still another object is to provide a multi check valve spray nozzle assembly that is subject to easy design modification for accommodating mounting of auxiliary items on the liquid boom without interference with the spray nozzles.

Other objects and advantages of the invention will become apparent upon reading the following detailed description and upon reference to the drawings.

Figure 1:
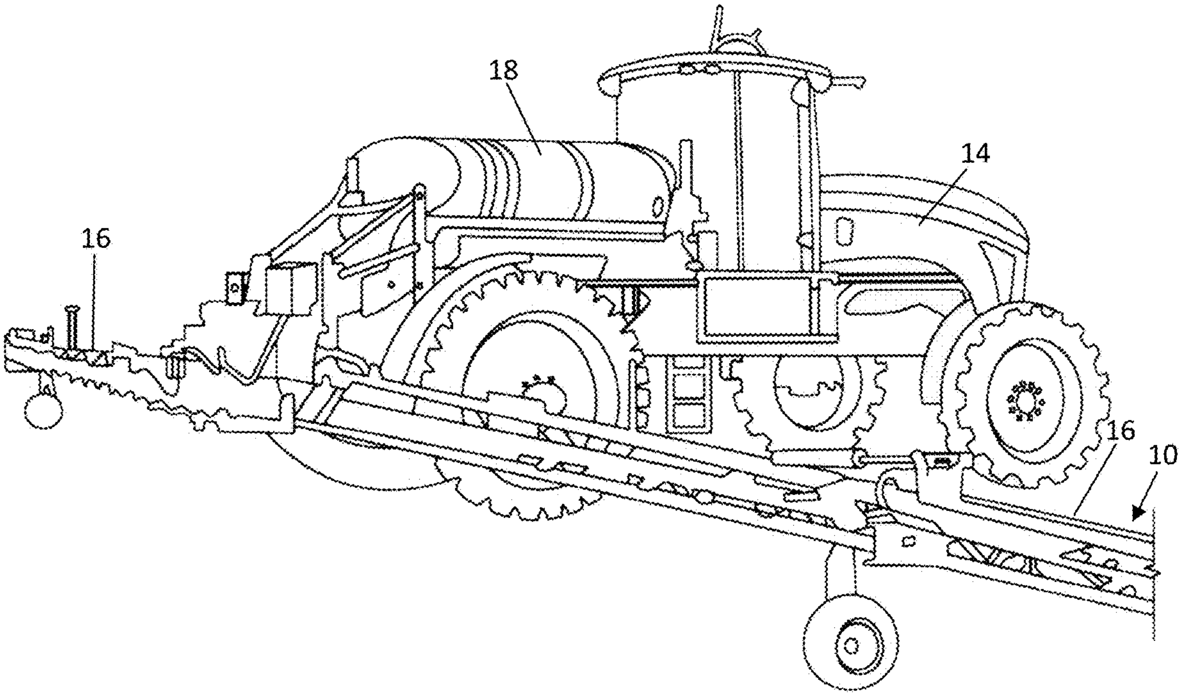
FIG. 1 is a perspective view of an exemplary spray boom being pulled by a motorized tractor.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Referring now more particularly to the drawings, there is shown an illustrative spray boom 10 (FIG. 1) having a plurality of liquid spray nozzle assemblies 12 (an example of which is shown in FIGS. 2-9) for spraying chemicals or other liquids onto a field along strips corresponding to the width of the spray boom 10 as it is being pulled by a tractor 14 or the like. The spray boom 10 in this case includes laterally extending support members 16 which support a liquid supply conduit along the length thereof, which may be coupled to a liquid supply tank 18 carried by the tractor 14. As is known in the art, the spray boom 10 support members 16 may comprise a plurality of elongated segments or sections that are coupled together to permit pivoting of the spray boom sections into adjacent side-by-side relation for transport or storage. The spray nozzle assemblies 12 in this instance each are configured for being supported in depending relation from the liquid supply conduit associated with the boom. While the spray nozzle assembly of the present invention has particular utility when employed along a spray boom such as shown in FIG. 1, it should be understood that the spray nozzle assembly is not limited to any particular application. For example, the spray nozzle assembly of the present invention may be used in any application in which a compact spray nozzle design is advantageous.

Referring to FIGS. 2-5, the illustrated spray nozzle assembly 12 includes a nozzle body 20 which includes a clamping device 38 with a liquid inlet 44 on an upper side thereof, a first liquid outlet section on an underside thereof in the form of a bottom drop outlet 24 having a central liquid passage 66, and a second liquid outlet section on a lateral side in the form of a lateral turret outlet 26 having a central liquid outlet passage 32. In this case, the bottom drop outlet 24 is adapted for receiving a spray tip having a quick disconnect configuration. However, it should be understood that other types of spray nozzles could be used. It will be understood that the terms "upper", "bottom", "front", and "back" as used herein are not limited to their literal meaning, but are intended as relative terms in relation to the spray nozzle assembly 12 illustrated in the drawings. In other words, the spray nozzle assembly 12 may be coupled to a liquid supply conduit with different orientations in which the liquid inlet and drop outlet sections of the nozzle body are not located on the "upper" and "lower" sides of the nozzle body as illustrated.

To allow an operator to quickly and easily change to different spray tips, the lateral turret outlet 26 of the nozzle body 20 is configured for supporting a rotatable spray turret 27. The illustrated spray turret 27 includes a cylindrical hub 28 that is removably mountable to the lateral turret outlet 26 of nozzle body 20 by, for example, a quick disconnect coupling such that the turret hub 28 is rotatable relative to the nozzle body 20. The spray turret 27, as is known in the art, has a plurality of circumferentially spaced spray tip mounting stems 30 extending radially outward of the hub 28. Each nozzle mounting stem 30 in this case is configured (similar to the bottom drop outlet 24 of the nozzle body 20) to receive a quick disconnect spray tip.

Figure 8:
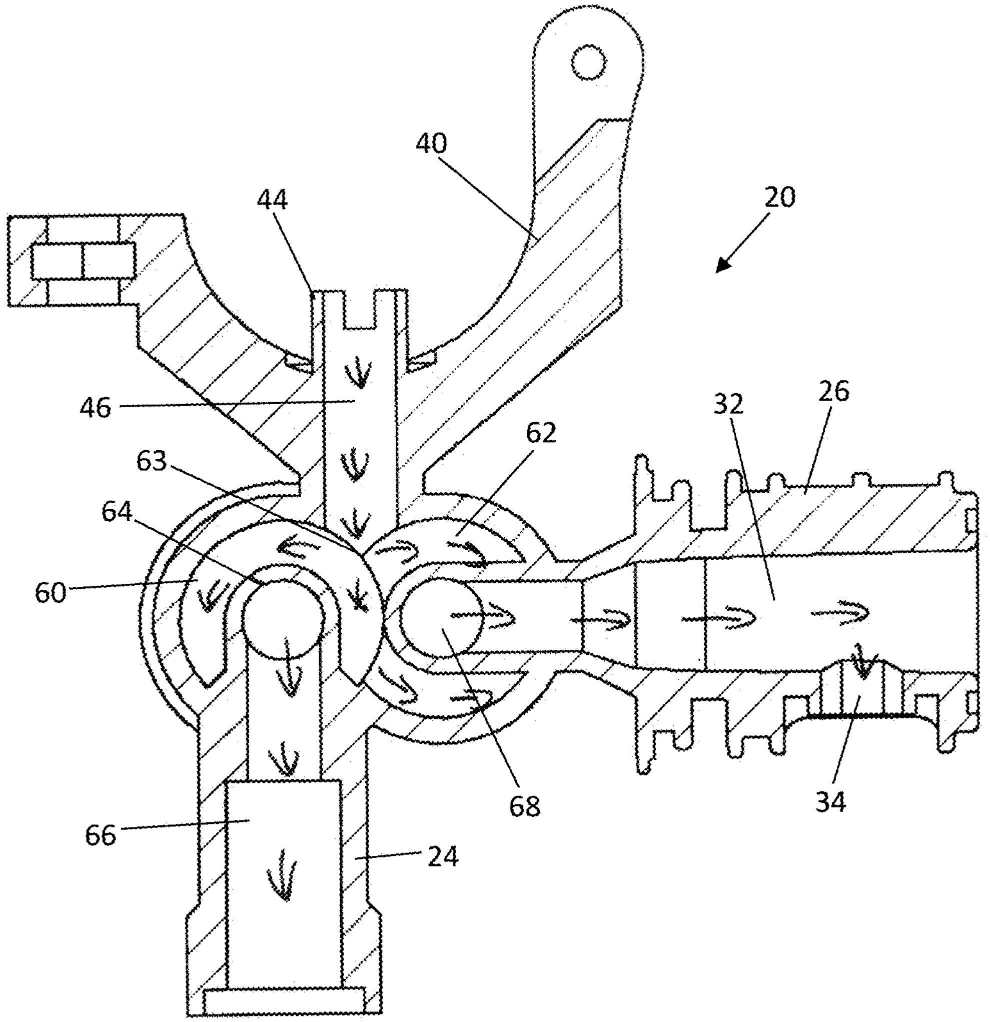
FIG. 8 is a vertical section of the illustrated nozzle body taken in the plane of line A-A in FIG. 7.

As described in greater detail below and shown in FIG. 8, of the lateral turret outlet 26 of the nozzle body 20 has a central liquid outlet passage 32 that communicates with a radially extending liquid exit passage 34. As is known, each nozzle mounting stem 30 can include a liquid flow passage which communicates with the spray tip mounted thereon. The liquid flow passage in each stem, in turn, can be selectively brought into aligned relation with the radial liquid exit passage 34 of the lateral turret outlet 26 by rotational indexing of the hub 28 to an operative position for a selected spray tip. When an individual spray tip is in the operative position, liquid in the central liquid outlet passage 32 of the lateral turret outlet 26 is directed via the radial exit passage 34 to the respective flow passage in the stem 30 associated with that spray tip from which the liquid is subsequently discharged through the spray tip.

For securing the spray nozzle assembly 12 to a liquid supply conduit, as noted above and shown in FIG. 2, a clamping device 38 is provided that includes a cradle-shaped mounting flange 40 that can be positioned adjacent an underside of the liquid supply conduit and a clamping element 42 pivotably connected to one end of the mounting flange 40 and positionable over the liquid supply conduit for securement to an opposite end of the mounting flange 40. In this case, the mounting flange 40 has a liquid inlet 44 in the form of a nipple which extends upwardly into the liquid supply conduit when the spray nozzle assembly 12 is attached thereto. The nipple 44 directs liquid into a liquid inlet passage 46 (see FIG. 8) that carries liquid into the nozzle body 20 as described in greater detail below. In the illustrated embodiment, the mounting flange 40 is integrated into the nozzle body 20 as a single piece, however, in other embodiments the mounting flange 40 may comprise a separate component that is removably connectable to the nozzle body 20.

To provide control over the discharge of liquid through the bottom drop outlet 24 and the lateral turret outlet 26, the spray nozzle assembly 12 has first and second check valve assemblies 48, 50 (see FIGS. 2 and 3) for respectively interrupting the liquid flow to the bottom drop outlet 24 and to the lateral turret outlet 26. The provision of a pair of check valves in the spray nozzle assembly 12 reduces waste by shutting at low pressures, providing precise control of flow to the drop and turret outlets 24, 26 and in some embodiments can allow for the pulse width modulation of spray. To this end, first and second check valve support sections 52, 54 (see FIGS. 5-7) are provided on opposite lateral sides of the nozzle body 20 transverse to the lateral turret outlet 26, each for receiving and supporting a respective one of the first and second check valve assemblies 48, 50. In this case, the illustrated first and second check valve assemblies 48, 50 include a cylindrical check valve housing that is threaded onto the respective check valve support section 52, 54. The transversely opposed check valve support sections 52, 54 are arranged relative to the clamping device 38 such that when the spray nozzle assembly 12 is mounted on a liquid supply conduit the check valve assemblies 48, 50 extend in parallel relation to the liquid supply conduit. Thus, the check valve assemblies 48, 50 do not protrude outwardly (forwardly or rearwardly) with respect to the spray boom 10 or increase the transverse footprint of the spray nozzle assembly 12 so as to cause interference with other spray nozzle assemblies 12 upon pivotable movement of the boom sections 16 into a retracted stored or travel position.

Figure 2:
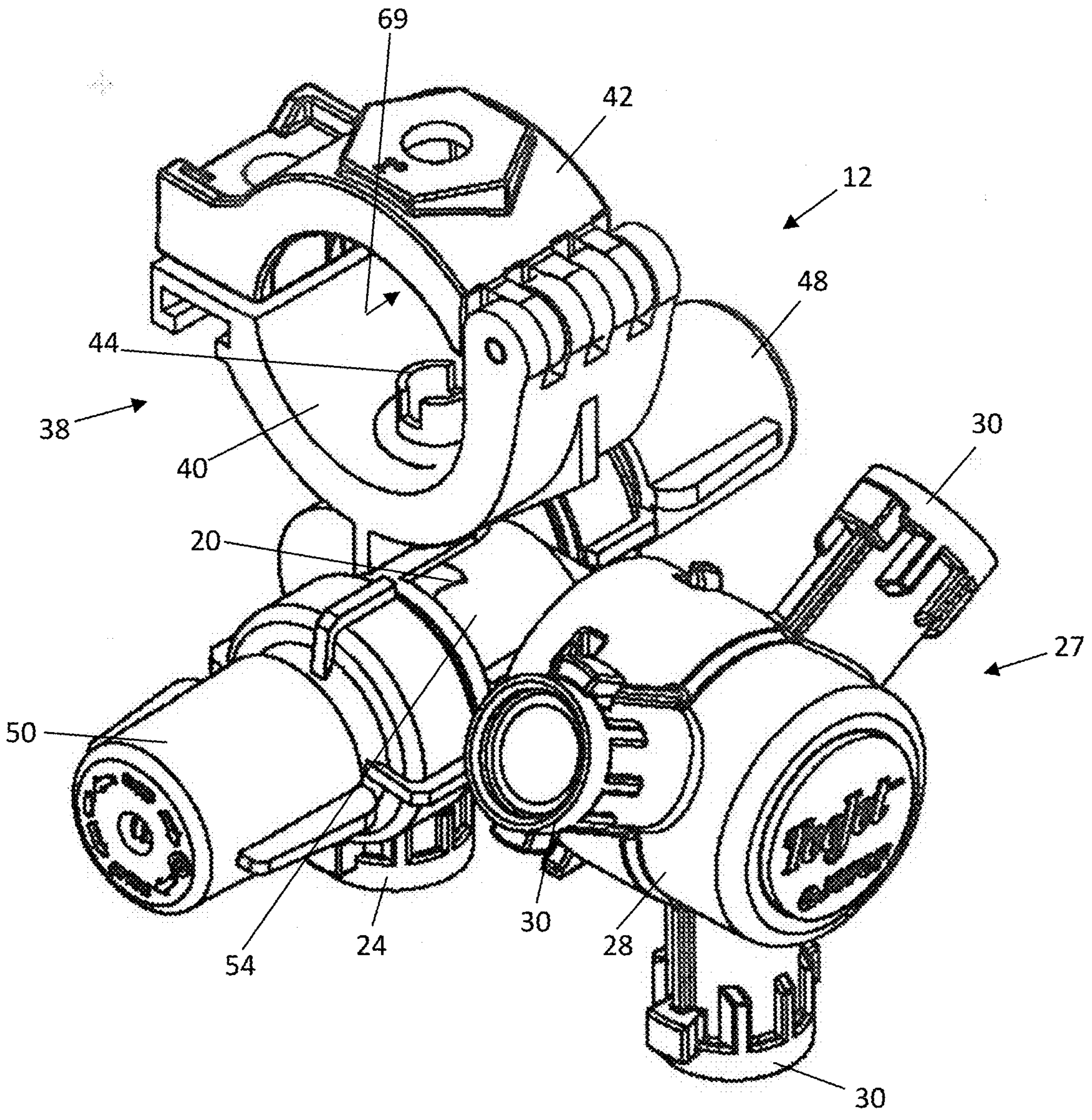
FIG. 2 is a perspective view of an illustrative spray nozzle assembly in accordance with the present invention.
Figure 3:
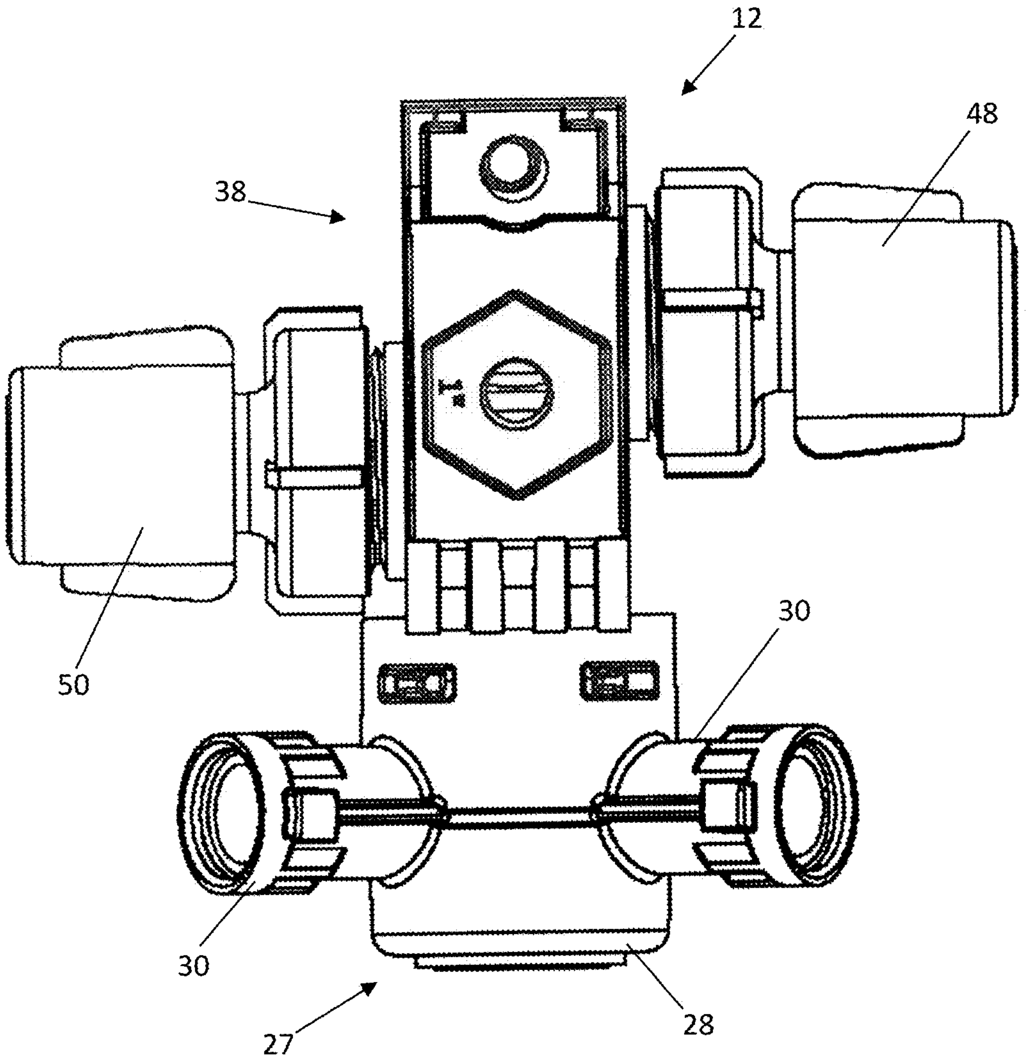
FIG. 3 is a top view of the spray nozzle assembly of FIG. 2.
Figure 4:
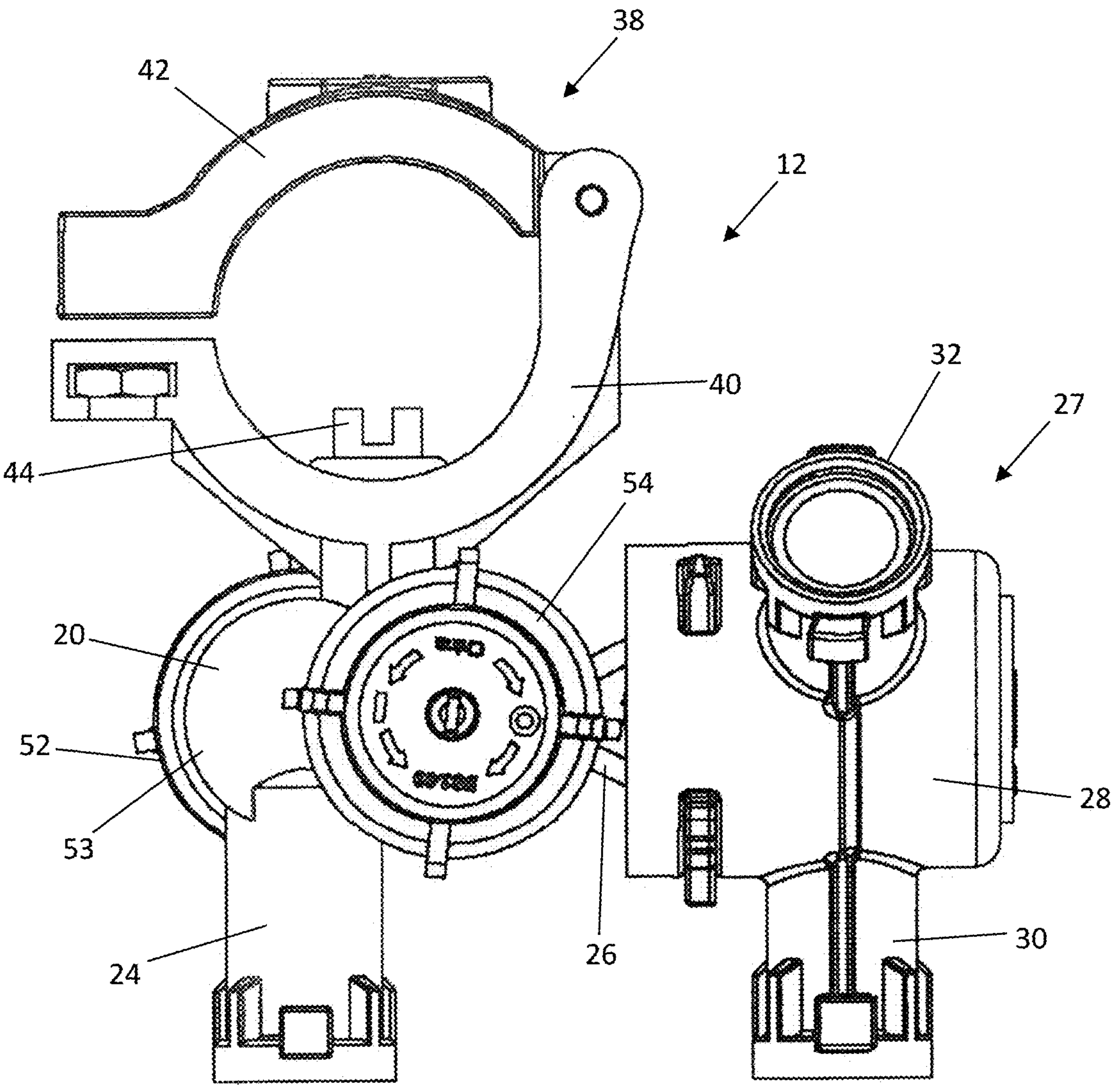
FIG. 4 is an end view of the spray nozzle assembly of FIG. 2.
Figure 5:
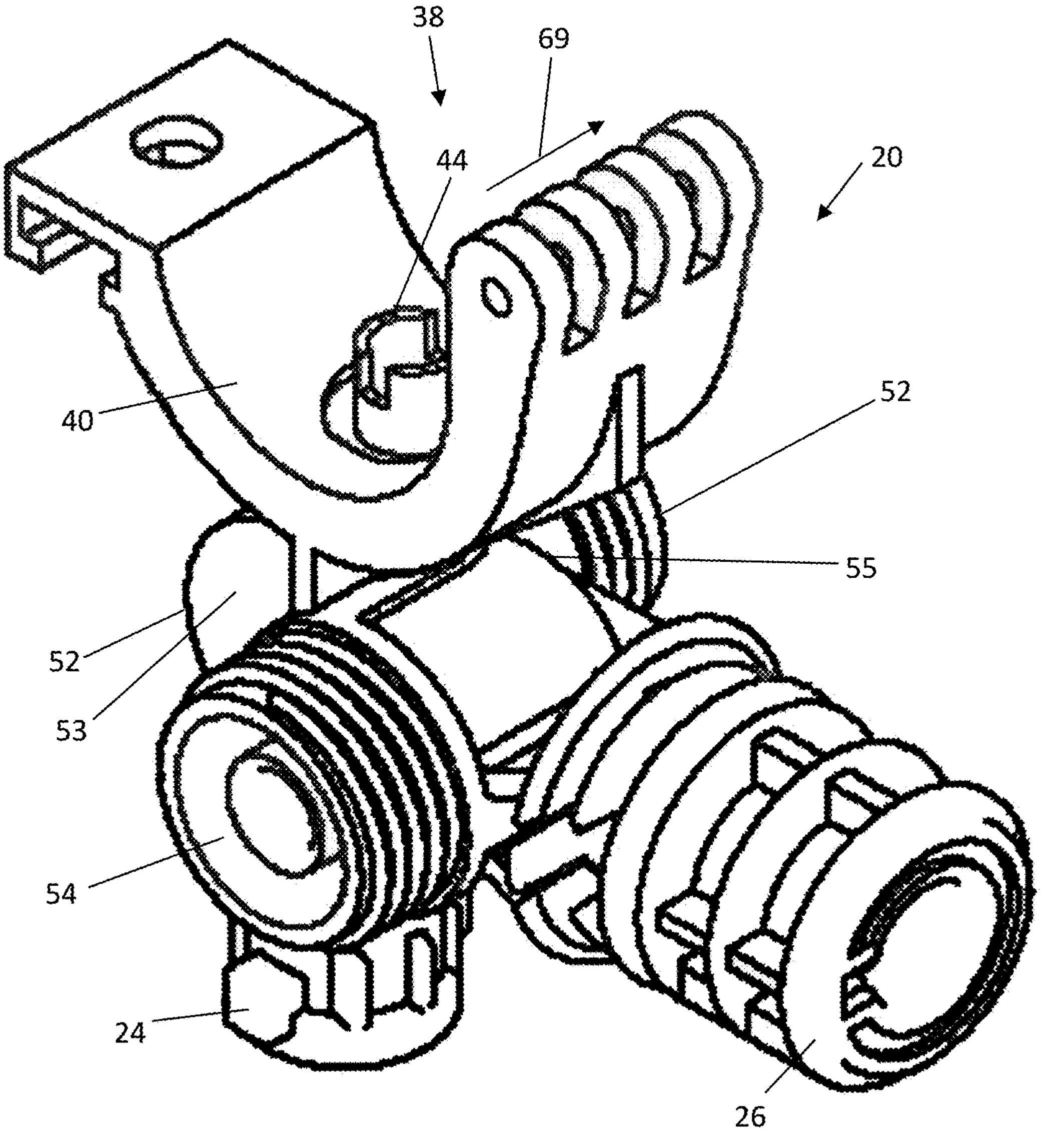
FIG. 5 is a perspective view of the nozzle body of the spray nozzle assembly of FIG. 2.
Figure 6:
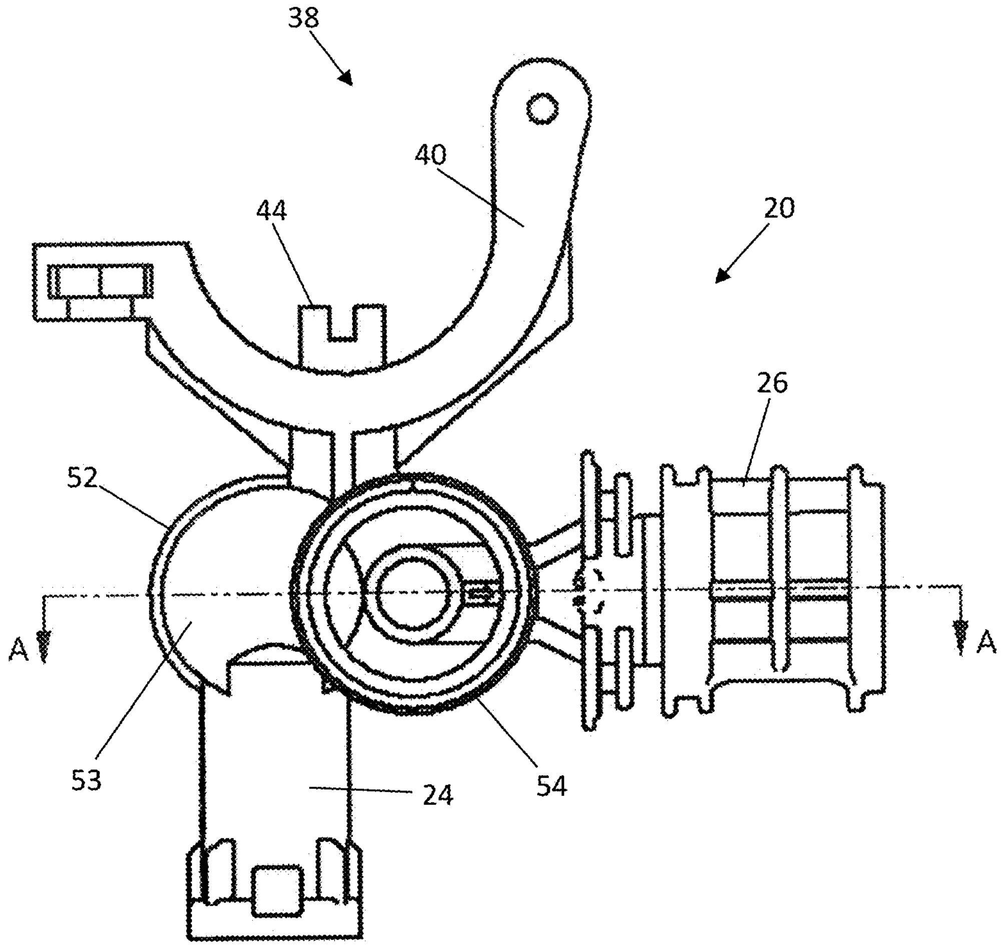
FIG. 6 is an end view of the nozzle body of FIG. 5.
Figure 7:
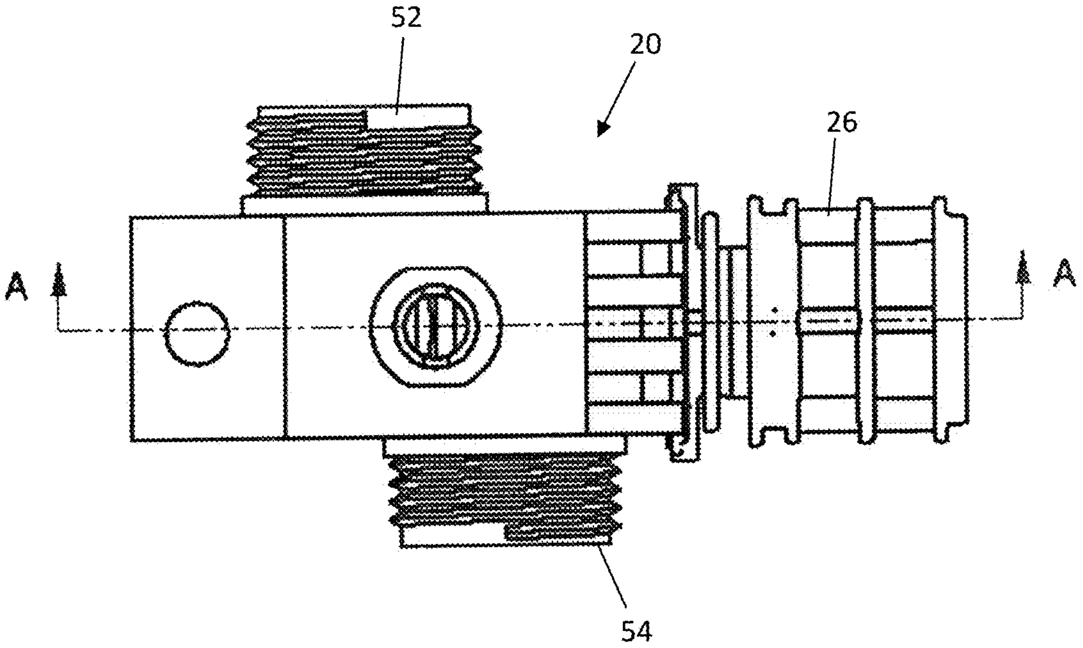
FIG. 7 is a top view of the nozzle body of FIG. 5.

According to one embodiment, each check valve assembly 48, 50 is spring actuated, comprising a diaphragm and a biasing spring for urging the diaphragm to a closed position such as is disclosed in U.S. Pat. No. 11,470,834, which is assigned to the same assignee as the present application and the disclosure of which is incorporated herein by reference. As depicted in FIGS. 2 and 4, the check valve support sections 52, 54 each have a respective open end onto which the check valve assembly 48, 50 is mounted and a closed opposite end 53, 55. It will be understood that different forms of check valves can be employed, including electronic solenoid, electronic stepper motor or pneumatically controlled check valves or any other device that shuts off flow.

Figure 9:
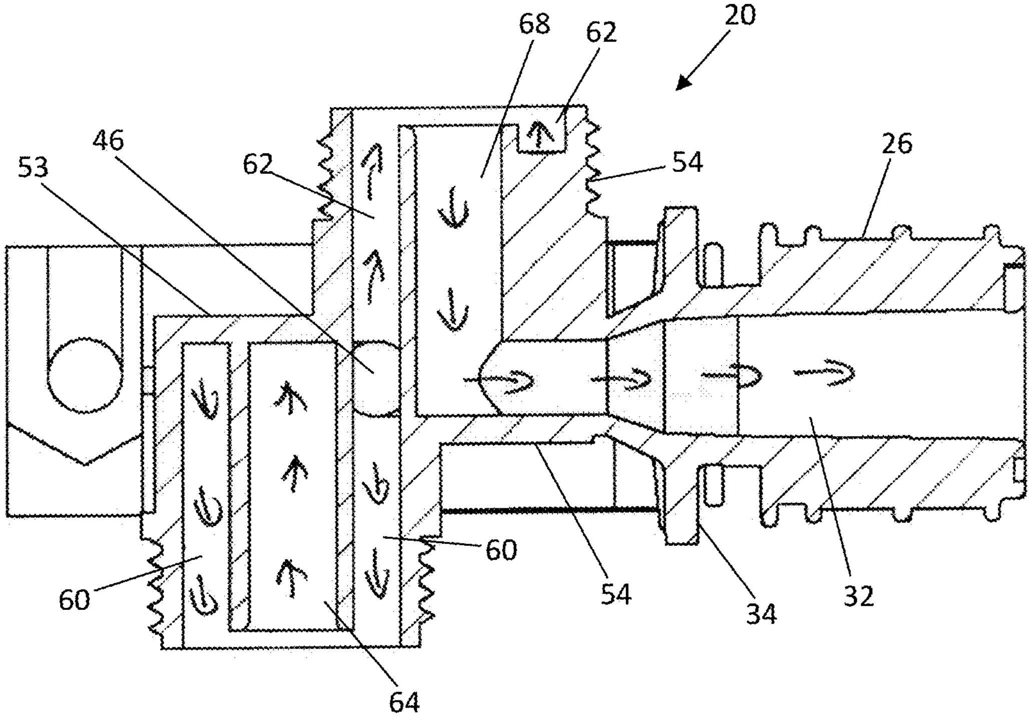
FIG. 9 is a horizontal section of the illustrated nozzle body taken in the plane of line B-B in FIG. 6.

In keeping with an important aspect of the present embodiment, the bottom drop outlet 24 and the lateral turret outlet 26 have a passage arrangement for more efficiently directing liquid to the check valve assemblies 48, 50. To that end, the check valve support sections 52, 54 for the bottom drop outlet 24 and the lateral turret outlet 26 have respective outer annular liquid flow passages 60, 62 with opposed lateral sides in overlapping relation for defining a common check valve liquid inlet 63. As depicted in FIGS. 8 and 9, the common check valve liquid inlet 63 communicates directly with the liquid inlet passage 46 for receiving and directing an unobstructed liquid flow to the respective check valve assemblies 48, 50. In particular, the annular outer flow passages 60, 62 are arranged with axes in the same horizontal plane when the spray nozzle assembly is mounted in a downward orientation such as shown in FIG. 2. With such arraignment, the liquid from the nozzle body liquid inlet passage 46 enters the first and second outer annular flow passages 60, 62 simultaneously through the common check valve liquid inlet 63. This is in contrast to an arrangement in which liquid entering the spray nozzle assembly must first pass through multiplicity of flow passages to reach check valves. In such arrangements, the flow of liquid can be significantly obstructed. The subject invention avoids such obstructed flow by directing liquid to the first and second outer annular passages 60, 62 simultaneously, thereby minimizing obstructions and improving spray performance.

Hence, the first and second outer annular flow passages 60, 62 direct a consistent liquid flow from the nozzle body inlet passage 46 to the first and second check valve assemblies 48, 50 respectively. If the first check valve assembly 48 is open, liquid from the first outer annular flow passage 60 is carried past the first check valve assembly 48 and into a first transverse passage 64 (see FIGS. 8 and 9) that directs liquid to a central outlet passage 66 (see FIG. 8) in the bottom drop outlet 24. The central liquid passage 66, in turn, carries liquid to a spray tip mounted on the bottom drop outlet 34. If the second check valve assembly 50 is open, liquid from the second outer annular flow passage 62 is carried past the second check valve assembly 50 and into a second transverse passage 68 (shown in FIGS. 8 and 9) that directs liquid to the central liquid passage 32 in the lateral turret outlet 26. The central liquid passage 32 in the lateral turret outlet 26, in turn, carries liquid to the radial discharge passage 34 (see FIG. 9) in the lateral turret outlet 26 and then into the spray turret 27. If the first and second check valve assemblies 48, 50 are closed, liquid in the first and second outer annular flow passages 60, 62 is blocked by the check valve assemblies 48, 50 from entering the first and second transverse passages 64, 68 and thus liquid is blocked from reaching the drop outlet 24 and the turret outlet 26. The more direct and simultaneous direction of liquid flow to the check valve support sections has been found to improve flow efficiency with a more compact spray nozzle assembly design.

The subject spray nozzle assembly further is adapted for versatile design to minimize interference caused by suspending axillary items, such as wiring and the like, from the spray boom 10. A plurality of spray nozzle assemblies 12 typically are mounted on the spray boom 10, with the lateral turret outlets 26 extending from the common side of the spray boom 10 and the bottom drop outlet 24 directed downwardly. The check valve support sections 52, 54 of the nozzle body, on the other hand, are protectively supported in underlying relation to the nozzle body 20 in laterally adjacent longitudinally offset relation to each other. As viewed from an upstream end (i.e. relative to the direction of liquid flow 69 along the spray boom 10 as diagrammatically depicted in FIGS. 2 and 5), the check valve support section 54 in this case extends rearwardly or upstream and supports the check valve assembly 50 at an upstream end as depicted in FIG. 10A, while the laterally adjacent check valve support section 52 extends downstream of the bottom drop outlet 24 and the closed check valve support section 54 for supporting the check valve assembly 48 at a downstream end.

Figure 10A:
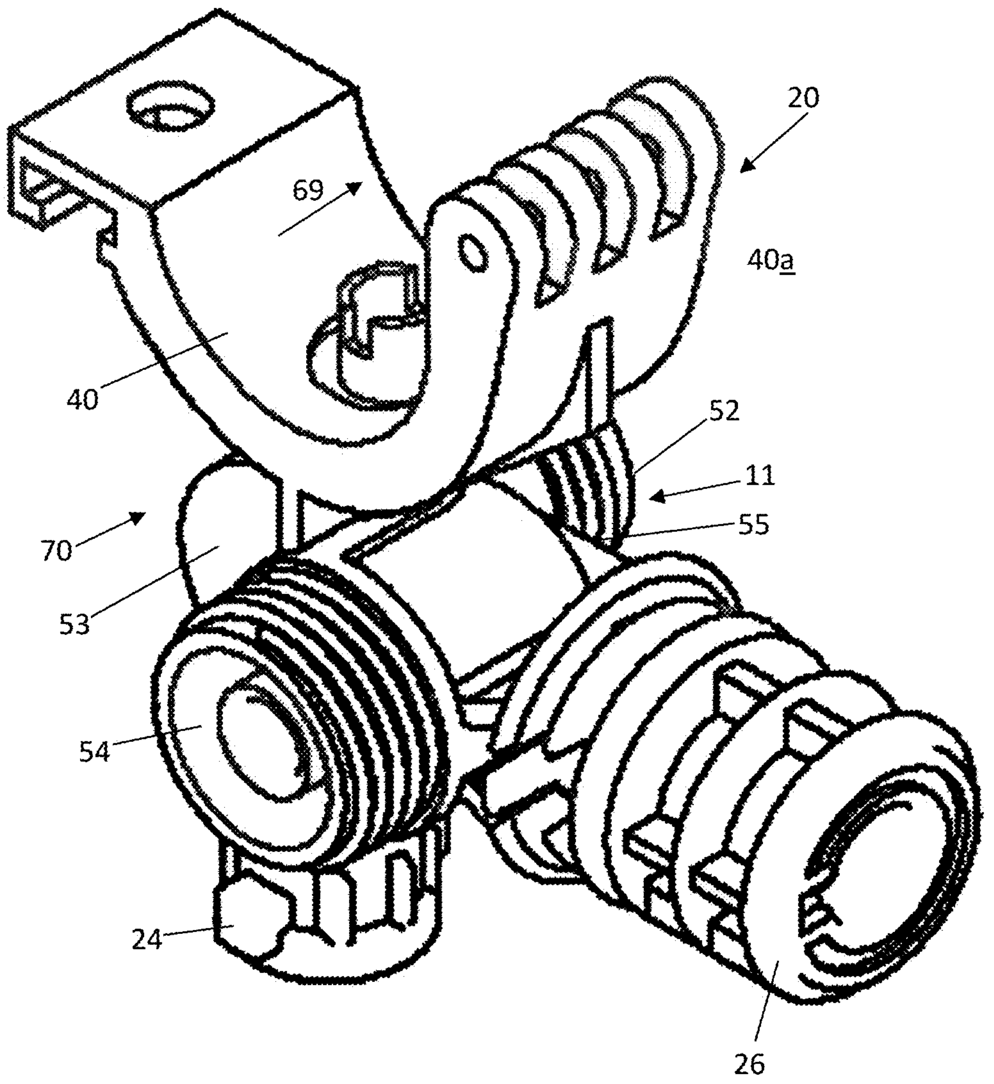
FIG. 10A is a perspective of the illustrated nozzle body with a first arrangement of open clearance spaces on an underside for accommodating auxiliary items mounted on the spray boom.

As depicted in FIG. 10A, a closed downstream end 55 of the check valve support section 54 and a side of the check valve support section 52 define a clearance space 71 opening under the spray 10 downstream and to the lateral turret outlet side of the nozzle body for accommodating items that may be suspended from the spray boom 10, while a closed end 53 of the check valve support section 52 and an inner side of check valve support section 54, define a second clearance space 70 opening under the spray boom 10 upstream and outwardly from an opposite side of the nozzle body 20.

Figure 10B:
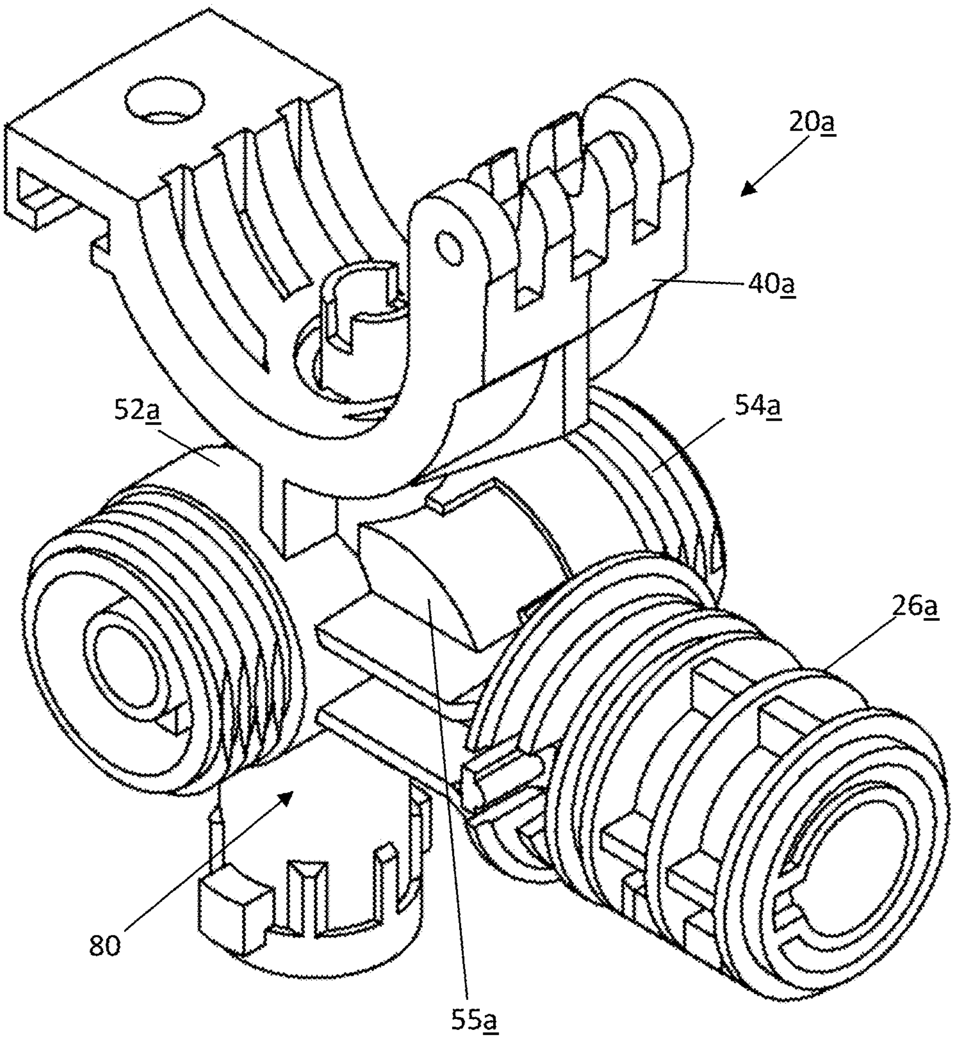
FIG. 10B is a perspective of a second or alternative embodiment of a nozzle body having a different arrangement of open clearance spaces on an underside thereof.

On the other hand, as depicted in FIG. 10B, where items similar to those described above have been given similar reference numerals with the distinguishing suffix "a" added, a nozzle body 20*a* is provided that has check valve support sections 52*a*, 54*a* defining clearance spaces, that are diametrically opposed to the clearance spaces 70, 71 of the nozzle body 10 for selective use in accommodating differently located suspended items from the spray boom 10. The check valve support section 54*a* for the check valve assembly 50 in this case extends downstream for supporting a check valve assembly 50 at a downstream end, while the check valve support section 52*a* extends upstream of the check valve support section 54*a* for supporting a check valve assembly 48 at an upstream end. The closed upstream end 55*a* of the check valve support section 54*a* and side of the check valve support section 52*a* define a clearance space 80 opening under the spray boom 10 extending rearwardly or upstream and outwardly to the turret side the nozzle body 20, and a downstream closed end of the check valve support section 52*a* and a side of the check valve support section 54*a*, opposite the turret outlet 26*a* define a clearance space (not visible in FIG. 10B) opening under the spray boom 10 downstream and to an opposite side of the nozzle body 20. Hence, by maintaining an inventory of nozzle bodies 20, 20*a* of each design, the user can select the desired nozzle body for most convenient usage for accommodating hanging items from the spray boom 20, while maintaining the rotatable turret 27 on a common side of the spray boom 10.

Hence, from the foregoing it can be seen that boom mountable spray nozzle assemblies are provided that have a compact design with a unique check valve control system for more efficiently routing liquids during spraying. Alternative arrangements of check valve support sections of the nozzle body define alternative clearance spaces for accommodating items suspended from the spray boom.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed:

1. A liquid spraying system comprising;
a liquid spray boom having a liquid supply conduit having a central longitudinal axis;
at least one spray nozzle assembly mounted on said liquid spray boom;
said spray nozzle assembly including:
a nozzle body;
said nozzle body having a liquid inlet section on an upper side of said nozzle body and a first liquid outlet section on a lower side of said nozzle body;
said liquid inlet section of said nozzle body having a liquid inlet passage and said first liquid outlet section of said nozzle body having a first liquid outlet passage;
said nozzle body having a second liquid outlet section extending transversely to said spray boom having a second liquid outlet passage;
a first spray nozzle removably mounted on said first liquid outlet section of said nozzle body with the first liquid outlet passage thereof communicating with said first spray nozzle;
a second spray nozzle removably mounted on said second liquid outlet section of said nozzle body with the second liquid outlet passage thereof communicating with said second spray nozzle;
said nozzle body having first and second check valve support sections on opposite lateral sides of said nozzle body in parallel relation to said central longitudinal axis of said spray boom liquid supply conduit transverse to said first and second liquid outlet sections;
a first check valve mounted on said first check valve support section of said nozzle body;
a second check valve mounted on said second check valve support section of said nozzle body;
said first check valve support section having a first annular lateral liquid passage communicating with said first check valve and said second check valve support section having a second annular lateral liquid passage communicating with said second check valve;
said first and second annular lateral liquid passages having parallel longitudinal axes laterally offset from each other with opposed lateral sides in overlapping relation to each other at a single point for defining a common direct liquid inlet at the point of overlap to said first and second annular lateral liquid passages of said first and second check valve support sections such that liquid from said liquid inlet passage of said liquid inlet section of said nozzle body simultaneously enters said first and second annular lateral liquid passages from said common direct liquid inlet;
said first check valve being operable between a closed position for preventing the flow of liquid from said nozzle body liquid inlet passage through said common direct liquid inlet to first annular lateral passage and said first spray nozzle and an open position for permitting the flow of liquid from said nozzle body inlet passage, said common direct liquid inlet and first annular lateral liquid passage to the outlet passage of said first liquid outlet section for discharge from said first spray nozzle; and
said second check valve being operable between a closed position for preventing the flow of liquid from said nozzle body liquid inlet passage through said common direct liquid inlet and second annular lateral liquid passage to the second spray nozzle and an open position for permitting the flow of liquid from said nozzle body liquid inlet passage, common direct liquid inlet, and said second annular lateral liquid passage to the outlet passage of said second liquid outlet section for discharge from said second spray nozzle.

2. The liquid spraying system of claim 1 in which said first and second annular lateral liquid passages have axes in a common horizontal plane.

3. The liquid spraying system of claim 1 in which said first check valve support section has a return liquid passage parallel to said first annular lateral liquid passage in liquid communication between said liquid inlet passage, said common direct liquid inlet, first annular lateral liquid passage and said liquid outlet passage of said first liquid outlet section for discharging liquid from said first spray nozzle when the first check valve is in an open position, and said second check valve support section has a return passage parallel to said second annular lateral liquid passage in liquid communication between said liquid inlet passage, said common direct liquid inlet, said second annular lateral liquid passage, and said liquid outlet passage of said second liquid outlet section for discharging liquid from said second spray nozzle when said second check valve is in an open position.

4. The liquid spraying system of claim 3 in which said return liquid passage of said first check valve support section is disposed within and parallel to said annular first annular lateral liquid passage; and said liquid return passage of said second check valve support sections is disposed within and parallel to said second annular lateral liquid passage.

5. The liquid spraying system of claim 1 in which said second spray nozzle is part of a turret spray nozzle assembly having a plurality of turret spray nozzles mounted on said second liquid outlet section of said nozzle body for selected rotation for locating one of the plurality of turret spray nozzles into position for receiving liquid from the liquid outlet passage of the second liquid outlet section when said second check valve is in an open position.

6. The liquid spraying system of claim 5 including a plurality of said spray nozzle assemblies mounted in laterally spaced relation along a length of said liquid spray boom with said turret spray nozzle assemblies supported on a common side of the liquid spray boom.

7. The liquid spraying system of claim 1 in which said check valves are operable to an open position in response to pressurized liquid from said liquid spray boom liquid supply conduit to said nozzle body inlet passage.

8. The liquid spraying system of claim 1 including a plurality of said spray nozzle said first and second check valve support sections of each of said spray nozzle assemblies, receive the respective first and second check valves at one end and have a closed opposite end; said first and second check valve support sections of one of said spray nozzle assemblies define a first arrangement of clearance spaces opening under said liquid spray boom from lateral sides and the closed ends of said first and second check valve support sections for accommodating items suspended from the liquid spray boom; and said first and second check valve support sections of a second of said spray nozzle assemblies define a second arrangement of clearance spaces different from said first arrangement of clearance spaces opening under the said liquid spray boom from lateral sides and closed ends of said first and second check valve support sections of said second spray nozzle assembly for accommodating items suspended from the liquid spray boom.

* * * * *